July 20, 1971          R. H. WESLEY ET AL          3,594,115

BACTERIA DESTRUCTION METHODS

Original Filed Sept. 30, 1963          2 Sheets-Sheet 1

INVENTOR.
Richard H. Wesley
Glen T. Williams
Wm. T. Wofford
Attorney

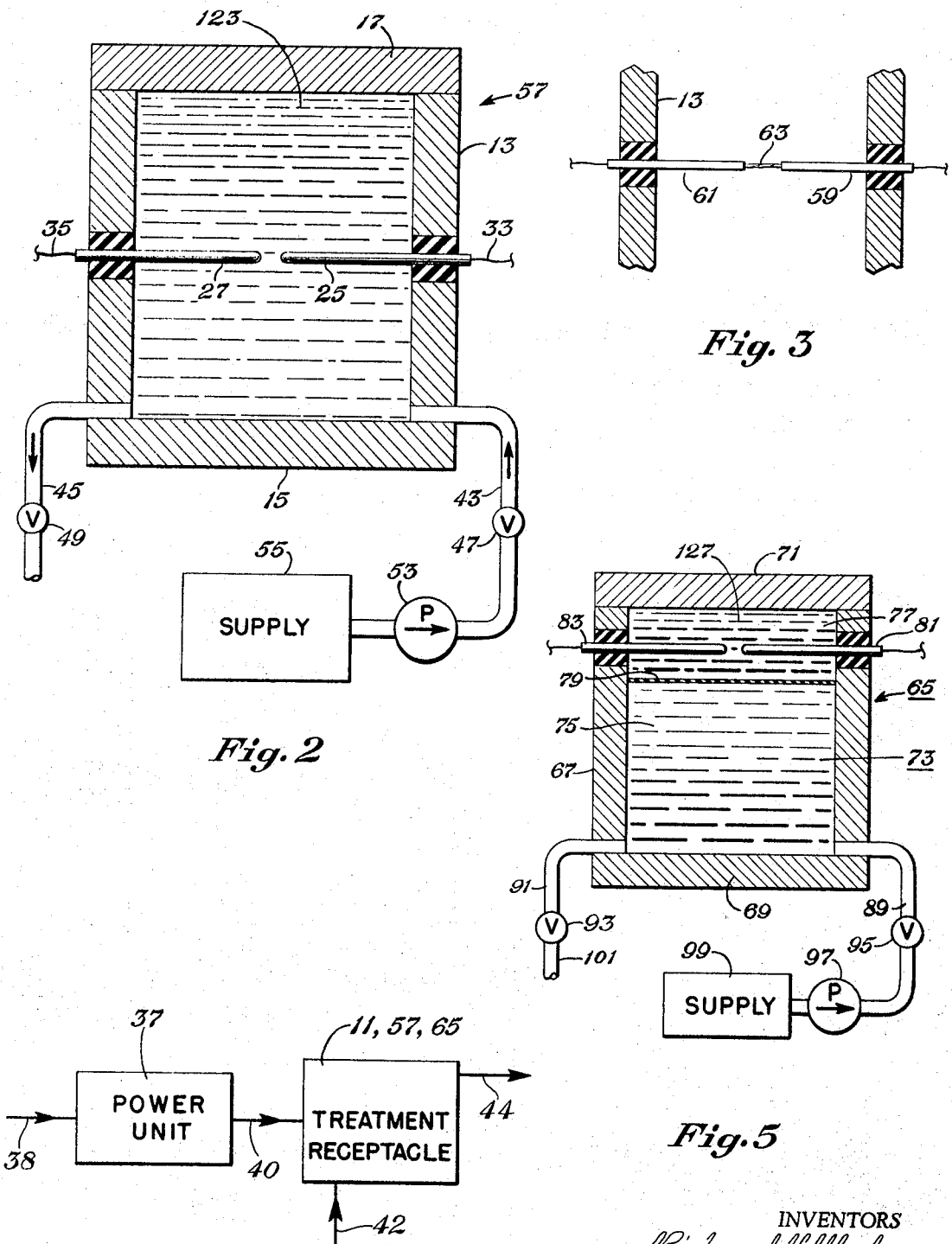

United States Patent Office 3,594,115
Patented July 20, 1971

3,594,115
BACTERIA DESTRUCTION METHODS
Richard H. Wesley and Glen T. Williams, Fort Worth, Tex., assignors to Electro-Hydraulics Corporation, Fort Worth, Tex.
Continuation of abandoned application Ser. No. 312,526, Sept. 30, 1963. This application Feb. 9, 1968, Ser. No. 704,490
Int. Cl. A61l 9/00; A23l 3/00; B01d 35/20
U.S. Cl. 21—54
19 Claims

ABSTRACT OF THE DISCLOSURE

Methods to destroy bacteria for various applications including food preservation, vaccine preparation and sewage treatment. Methods involve confining matter to be treated in a closed receptacle which is capable of withstanding high intensity shock wave impulses and high pressure build-up, filling the receptacle with a non-gaseous fluid (if the matter being treated is in liquid form, then the receptacle will already be filled with non-gaseous fluid), and discharging from electrodes within the receptacle a quantity of electric energy, with the parameters of energy quantity, discharge time duration, and discharge current being within specified ranges to produce high intensity shock wave impulses and high pressure build-up within the fluid.

---

This is a continuation of application S.N. 312,526, filed Sept. 30, 1963, now abandoned.

Our invention relates to improved methods to destroy bacteria.

The presence of bacteria in animal and vegetable matter in the form of food for human consumption has long presented difficulties concerning the preservation of such foods. It is well known that foods are preserved when the bacteria in them are destroyed. The problem has been to find an economical, efficient, and effective way to destroy the bacteria without deleteriously affecting the food.

Difficulties have also been encountered in the appropriate destruction of bacteria in other fields. One of these is vaccine preparation where live bacteria must be present during some stages of preparation but must also be appropriately destroyed before the final product is achieved. Another is sewage treatment of such nature that the destruction of bacteria renders the sewage innocuous.

The general object of the present invention is to provide improved methods to kill bacteria and to halt bacterial action.

Another object of the invention is to provide economical, efficient and effective methods to kill bacteria and to halt bacterial action in animal and vegetable matter.

Another object of the invention is to provide improved methods to kill bacteria and to halt bacterial action in food substances without producing a deleterious effect on the food.

Another object of the invention is to provide economical, efficient and effective methods to kill bacteria in vaccine preparations.

Another object of the invention is to provide economical, efficient and effective methods to render sewage innocuous by destroying bacteria therein.

Methods to accomplish appropriate destruction of bacteria in accordance with the principles of the present invention comprise subjection of the bacteria carrying substance to the effects of the sudden discharge of a suitable quantity of electric energy from electrodes immersed in an appropriate pressure transmitting medium within a closed chamber.

For a further understanding of the invention and further objects, features, and advantages thereof, reference may now be made to the following description taken in conjunction with the accompanying drawings in which:

FIG. 2 is a schematic drawing, partly in section, showing a second form of apparatus which is suitable for practicing the present invention in another aspect thereof;

FIG. 3 is a schematic sectional view of a pair of electrodes and an initiating filament disposed therebetween;

FIG. 4 is a block diagram indicating a general arrangement of apparatus that may be used in practicing the invention;

FIG. 5 is a schematic drawing, partly in section, showing a third form of apparatus which is suitable for practicing the present invention in yet another aspect thereof.

Figure 1:
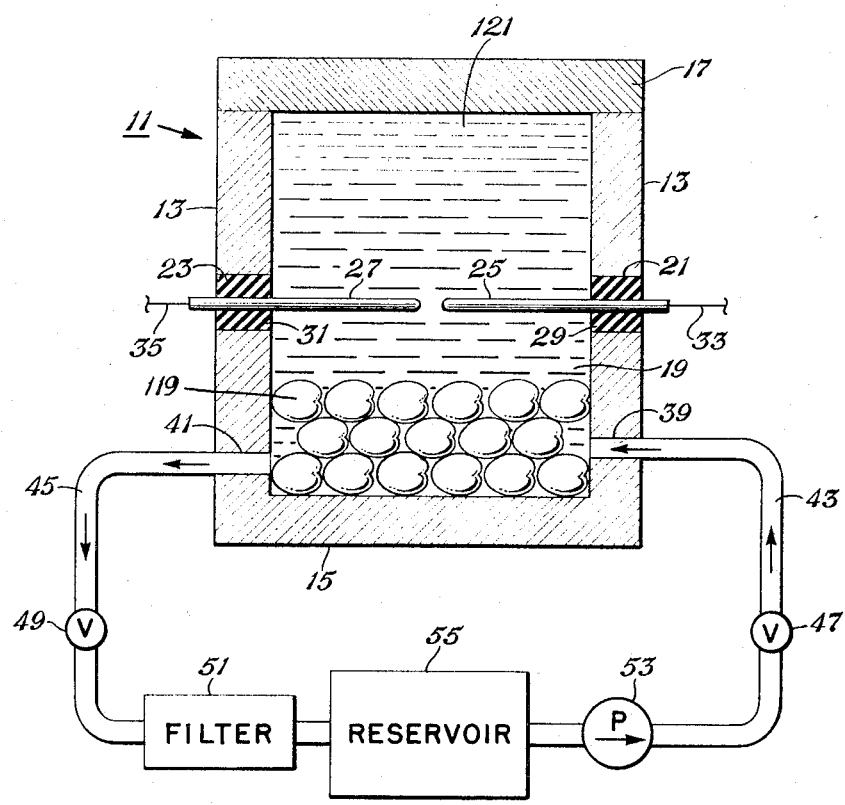
FIG. 1 is a schematic drawing, partly in section, showing a first form of apparatus that is suitable for practicing the present invention in one aspect thereof.

Referring to the drawings, FIG. 1 illustrates a first form of treatment receptacle 11 including side walls 13, a bottom 15 and a removable top 17, which taken together define a chamber or cavity 19 within the receptacle 11. The side walls 13 and bottom 15, preferably, are integrally formed and have a substantial thickness, for a purpose that will be disclosed hereinafter. The top 17, though removable, also has a substantial thickness for the same purpose and, when it is in place on the walls 13 of the receptacle 11, it may be secured and sealed thereto in any appropriate manner. In the side walls 13, there is provided a pair of opposed openings 21, 23 through which a pair of electrodes 25, 27 extend into the cavity 19. The electrodes may be electrically insulated from the side walls 13 by means of suitable insulating inserts 29, 31, or in any other suitable manner. The electrodes 25, 27 may be located in any convenient position, but for most purposes are preferably located in the central region of the cavity 19. Attached to the electrodes 25, 27 are conductors 33, 35 respectively, which are connected in the output circuit of a suitable electric power unit.

A first fluid conduit 45 communicates with the cavity 19 and is connected via a first valve 49 and a suitable fluid filter 51 to a reservoir 55. A second conduit 43 is connected from the reservoir 55 via a fluid pump 53 and a second valve 47 to communicate with the cavity 19.

FIG. 2 illustrates a second form of a treatment receptacle 57 which, basically, is the same type of receptacle as shown in FIG. 1. It will be observed that the apparatus of FIG. 2 does not include a fluid filter, and also that the fluid conduit 45 does not connect to the supply reservoir. The reasons for these differences will be explained hereinafter.

FIG. 3 illustrates a pair of electrode elements 59, 61, which may be considered as extending through the walls 13 into the cavity 19 of a typical treatment receptacle 11 the same as the electrodes 25, 27 of FIGS. 1 and 2 but with a filament 63 connected therebetween.

FIG. 5 illustrates a third form of treatment receptacle 65 which comprises side walls 67, a bottom 69 and a removable top 71, which may be similar to the top 17, all of which taken together define a chamber or cavity 73 within the receptacle 65. The cavity 73, however, is subdivided into a lower or first chamber 75 and an upper or second chamber 77, by means of a membrane or diaphragm 79, which may be sealingly fixed to the walls of the cavity 73 in any appropriate manner. The diaphragm 79 may be made of any suitable impervious, flexible, resilient substance such as rubber, plastics, metal and the like. Projecting through the walls of the second chamber 77 are a pair of electrode elements 81, 83 which may be similar to the electrode elements 25, 27, shown and described hereinbefore. The electrode elements 81, 83 are also insulated from the side walls 67 by means of suitable insulating inserts 29, 31. The electrode elements 81, 83 are connected by suitable conductors 33, 35 to a power unit.

The first chamber 75 is communicated with inlet and outlet conduits 89, 91; valves 93, 95; a fluid supply source 99 and a fluid pump 97, all of which are disposed in the same way as corresponding components which are associated with the treatment receptacle 57 of FIG. 2. While not specifically shown, the second or upper chamber 77 may be communicated by components in the same manner as shown by FIG. 1 for the treatment receptacle 11.

Figure 6:
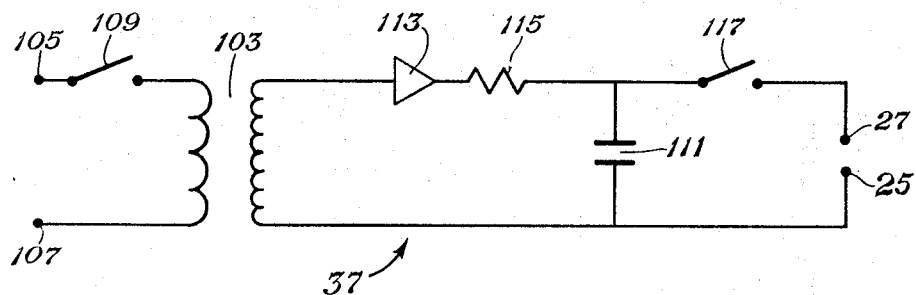
FIG. 6 is a schematic electrical circuit diagram indicating a typical type of power unit which is suitable for use in practicing the present invention.

A typical electric power unit 37 is shown in diagrammatic simplified form by FIG. 6. The power unit 37 includes a transformer 103, the primary winding of which may be connected at terminal 105, 107 to a source of alternating current via a suitable switch 109. The secondary winding of the transformer 103 is connected in series with a suitable rectifier 113, a current limiting resistor 115 and a capacitor bank 111. The capacitor bank 111 is connected in series with a second switch 117 and the electrodes 25, 27. For a more detailed description of an electric power unit that is also suitable for the hereinafter described purpose, reference may be made to Pat. No. 3,093,770 issued June 11, 1963 to Richard H. Wesley, et al.

In FIG. 4 there is indicated a general arrangement of apparatus that may be used in the practice of the present invention, including a suitable power unit 37 connected at its input via leads 38 to an electric power source (not shown) and connected at its output via leads 40 to the electrodes of a suitable treatment receptacle, with the treatment receptacle being provided with suitable input and output conduits 42, 44.

In the present invention, the primary factors involved in the production of effective and satisfactory electric energy discharge effects are: the quantity of stored electrical energy available for each energy pulse; the amount of electric current; the time of discharge of the energy; and the volume of the cavity, or chamber, in which the energy is discharged. The primary effect of the energy discharge insofar as the present invention is concerned is thought to be the production in the pressure transmitting medium of a high intensity steep wave-front shock wave accompanied or immediately followed by a very high pressure buildup. It is emphasized that the shock wave just mentioned is of a mechanical nature and is not an electric shock.

In a typical instance, where the pressure transmitting substance is water, preferably at atmospheric conditions and ambient temperature, a quantity of electrical energy in the range of between 2500 and 22,000 joules may be required to treat material in a chamber having a volume of about one gallon capacity. That is to say, the required energy per unit volume may be selected from values proportional to the values within the range of 10 to 96 joules per cubic inch. Moreover, the discharge current should be at least 1500 amperes, and the time of discharge should be less than one millisecond. The energy-volume value will, as mentioned, vary proportionately with the size of the chamber; and the current, in amperes, may vary between about 1500 and 60,000, with a preferred minimum value of about 5,000. For a given chamber volume, the intensity of the shock-wave impulse and the pressure build-up may be controlled, to a large extent, by the quantity of stored energy and the discharge interal of time; it being understood that a shorter discharge time interval produces a more intense and sudden shock-wave impulse and pressure build-up. Consequently, preferred discharge time interval may be within the range of between 50 and 300 microseconds, but, in any event, it should be not more than one millisecond.

Now, to understand the method of the present invention, as practiced in conjunction with the several forms of apparatus previously described herein, reference may be made initially to FIG. 1. When practicing the present invention for the purpose of preserving foods, the treatment receptacle 11 may be charged with a quantity of a solid type of food 119 such as apples, oranges, potatoes, carrots, and the like, but, preferably, only one kind of solid food is treated at any one time; that is, foods of different kinds are not placed in the receptacle at the same time. After the top 17 has been securely fastened in place, the pump 53 may be operated to move a liquid 121, or other suitable substance, from the supply reservoir 55 into the cavity 19, so as to fill the cavity 19. The liquid 121 in the supply reservoir 55 is, preferably, ordinary water at ambient temperature and atmospheric conditions. When the cavity 19 is permeated by the liquid 121, or water, the flow thereinto may be stopped by closing the valves 47, 49. The power unit 37 is now operated by first closing the switch 109, whereupon the bank of capacitors 111 becomes charged, and thereafter, the switch 109 may be opened. Now, to treat the solid type food 119, it is only necessary to close the switch 117. The electrical energy which is stored in the capacitor bank 111 is suddenly and immediately discharged from the electrodes 25, 27. This results in the formation of an intense steep-front shockwave, and an intense pressure build-up in the liquid 121 in the cavity. The shock-wave and the pressure build-up resulting from this electrical discharge, can be substantial, and, for this reason, the walls, bottom and top 13, 15, 17 of the food treatment receptacles 11, 57, 65 have a substantial thickness, so as to be capable of withstanding the shock-wave impulse and the high pressures developed. The steep-front shock-wave is transmitted by means of the water 121 in the cavity, to all parts thereof. Accordingly, each item of food within the cavity is also subjected to the same intense steep-front shock-wave and to the intense pressure build-up. As soon as the shock-wave impulse and the pressure have subsided, which occurs in a very short space of time, the valve 49 may be opened to allow the water in the receptacle 11 to drain back to the supply reservoir via the filter. Thereupon, the top 17 may be unsealed and removed, so that the solid type food 119 in the receptacle 19 may be removed and replaced by another quantity of food. The process may thereafter be repeated.

It is believed that the shock-wave impulse and the pressure build-up, in some manner, kill practically all of the living bacteria in the foods, because, after such a treatment, the foods are rendered practically sterile, and they may be preserved for almost an indefinite period of time without refrigeration.

Liquid foods, such as fruit juices and the like, may also be treated and preserved in a similar manner as solid foods, using the form of apparatus shown in FIG. 2. The treatment cavity, in this instance, is charged with a quantity of liquid food 123 by operating the pump 53, which moves the liquid food 123 from the supply reservoir 55 via the fluid conduit 43 and valve 47; the valve 49 being closed. When the cavity has been filled, the valve 47 is closed and the power unit is operated to charge the capacitor bank 111, as before described. In like manner, the electrical energy which is stored in the power unit 37 is suddenly and immediately discharged from the electrodes 25, 27 and an intense steep-front shock-wave and pressure build-up are transmitted practically instantaneously throughout all of the liquid food 123, which also serves as the pressure transmitting medium. When the shock-wave has subsided, which occurs in a very short space of time, the outlet valve 49 may be opened so that the treated liquid food may flow therefrom via the conduit means 45 to another location for further processing. After all of the treated liquid food 123 has been removed from the cavity, the valve 49 may be closed and the valve 47 may be opened to recharge the cavity 19. The process cycle may then be repeated. The liquid food 123 which has been subjected to such treatment is also rendered practically sterile and it is thus preserved for almost an indefinite period of time.

In some applications it may be more desirable to treat certain liquid foods in a receptacle of the type shown in FIG. 5. This may be particularly important where the liquid food is milk, or the like. In this instance a quantity of such liquid food 125 is moved, as before described, by the pump 97 from the supply reservoir 99 into the first chamber 75, via the valve means 93 and fluid conduit 89. When the first chamber 75 is filled, the valve 93 may be closed (the valve means 95 being closed initially) to retain the liquid food within the first chamber 75. A suitable pressure transmitting substance 127, such as water, may then be introduced, using any suitable means, into the second chamber 77 until it is filled. Thereupon, the electrical energy stored in the previously operated power unit 37 may be discharged, as before described from the electrode elements 81, 83. As mentioned previously, the sudden and immediate discharge of this energy produces a steep-front shock-wave and a pressure build-up, within the pressure transmitting substance 127, which is transmitted throughout all of the second chamber. The shock-wave and the pressure build-up developed therein impinge upon the flexible, resilient diaphragm or membrane 79 disposed between the two liquids. Whereupon, the steep-front shock-wave impulse and the pressure build-up are transmitted by the membrane to and throughout the liquid food 125, with the equivalent effectiveness of a similar electrical energy discharge within the liquid food 123 (as decribed previously in connection with FIG. 2). It should be mentioned that the pressure transmitting substance 127 may be a true fluid, such as water, or it may be a finely divided, powdery, inert substance having the inherent characteristic of fluidity; such substance, for example, may be graphite, vermiculite, molybdenite, and the like; or, it may be any suitable substance that is capable of transmitting a shock-wave and pressure build-up.

Thus, it is apparent that either the apparatus of FIG. 1, FIG. 2, or FIG. 5 may be used to effectively practice the present invention with respect to foods.

In another application, such as the preparation of vaccines, the methods of the present invention are effective and useful. In practicing the present invention for this purpose, the vaccine may be introduced into the first chamber 75 (see FIG. 5), from the supply reservoir 99 via the pump 97, or in any suitable manner, until such chamber is filled. Thereafter, the valve 93 may be closed (the valve 95 being closed initially) to hold the vaccine within the first chamber 75. A suitable shock-wave and pressure transmitting substance 127, such as those mentioned previously, may then be introduced into the second chamber 77, via the suitable means mentioned hereinbefore, whereupon the substance 127 may be subjected to the intense shock-wave impulse and the intense pressure build-up resulting from the discharge of stored energy, as described before. The vaccine in the first chamber will, of course, be subjected to the same intense shock-wave impulse and the same pressure build-up which is transmitted thereto through the flexible diaphragm or membrane 79.

Thereupon, the treated vaccine, now safe and innocuous, may be removed from the first chamber, and the process may be repeated using a new charge of vaccine.

Another useful application of the principles of our invention is the treatment of sewage to render it innocuous. In practicing the present invention, when applied to sewage treatment, raw sewage may be moved from a supply source 55 (see FIG. 2), via the pump 53, valve means 47, and inlet conduit 43, into the cavity of the receptacle 57; the valve means 49 being initially closed. The sewage fills the cavity and it may be readily maintained therein by closing the valve means 47. The power unit may then be operated to store a quantity of electrical energy, as described previously. When sufficient energy is stored, it may be suddenly and immediately discharged from the electrodes 25, 27. As mentioned previously, this sudden discharge of energy gives rise to an intense pressure build-up within the sewage. It is believed that the shock-wave impulse and the pressure build-up, in some manner, kill practically all of the living bacteria in the raw sewage, because, after such a treatment, the sewage is rendered innocuous and it may be removed from the receptacle 57 and disposed of as substantially inert matter.

It should be mentioned that the electric energy discharge effects may be applied one or more times to a given substance in the cavity. The application of the process is not in any way restricted to only a single discharge of energy. If preferred, in some applications, a plurality of receptacles may be connected together so that a once-treated substance may be caused to move via suitable conduits into a second receptacle wherein the substance may be again treated.

In all of the applications of the invention herein described the electrical energy may be discharged across a gap between spaced apart electrodes, such as electrodes 25, 27, or it may be discharged through a filament such as filament 63 shown in FIG. 3, the latter being preferred in most instances.

The principles of the present invention have been herein described as applied to the treatment of three distinct types of substances, but it will be apparent to those skilled in the art that the present invention may be readily applied to kill the bacteria in and to preserve many other kinds and types of animal and vegetable substances.

The foregoing disclosure and the showing made in the drawings are merely illustrative of the principles of this invention and are not to be interpreted in a limiting sense.

We claim:
1. The method to destroy bacteria and halt bacterial action, comprising the steps of:
   (a) placing a quantity of bacteria carrying matter to be treated within a treatment receptacle capable of withstanding high intensity shock wave impulses and high pressure buildup;
   (b) closing the receptacle;
   (c) filling the receptacle with a non-gaseous fluid which is capable of effectively transmitting a shock-wave impulse and pressure build-up;
   (d) discharging from electrodes within the receptacle a quantity of electric energy per cubic inch of treatment receptacle of at least 10 joules per cubic inch, with said discharge taking place within a time interval of less than one millisecond and with the discharge current being at least 1500 amperes.

2. The method as set forth in claim 1, wherein the matter to be treated is food.

3. The method to destroy bacteria and halt bacterial action, comprising the steps of:
   (a) placing a quantity of bacteria carrying matter to be treated within a treatment receptacle capable of withstanding high intensity shock wave impulses and high pressure build-up;
   (b) closing the receptacle;
   (c) filling the receptacle with a non-gaseous fluid which is capable of effectively transmitting a shock wave impulse and pressure build-up;
   (d) discharging from electrodes within the receptacle a quantity of electric energy per cubic inch of treatment receptacle of at least 10 joules per cubic inch, with said discharge taking place within a time interval within the range of 50 to 300 microseconds and with the discharge current being within the range of 50 to 300 microseconds and with the discharge current being within the range of 5,000 to 60,000 amperes.

4. The method as set forth by claim 3, wherein the matter to be treated is food.

5. The method to destroy bacteria in matter in liquid form, comprising the steps of:
  (a) filling a closed treatment receptacle capable of withstanding high intensity shock wave impulses and high pressure build-up with the liquid matter to be treated; and
  (b) discharging from electrodes within the receptacle a quantity of electric energy per cubic inch of treatment receptacle of at least 10 joules per cubic inch, with said discharge taking place within a time interval of less than one millisecond and with the discharge current at least 1500 amperes.

6. The method as set forth by claim 5, wherein the matter to be treated is food.

7. The method as set forth by claim 5, wherein the matter to be treated is vaccine.

8. The method as set forth by claim 5, wherein the matter to be treated is sewage.

9. The method to destroy bacteria in matter in liquid form comprising the steps of:
  (a) filling a closed treatment receptacle capable of withstanding high intensity shock wave impulses and high pressure build-up with the liquid matter to be treated; and
  (b) discharging from electrodes within the receptacle a quantity of electric energy per cubic inch of treatment receptacle of at least 10 joules per cubic inch, with said discharge taking place within a time interval within the range of 50 to 300 microseconds and with the discharge current being within the range of 5,000 to 60,000 amperes.

10. The method as set forth by claim 9, wherein the matter to be treated is food.

11. The method as set forth by claim 9, wherein the matter to be treated is vaccine.

12. The method as set forth by claim 9, wherein the matter to be treated is sewage.

13. The method to destroy bacteria in matter, comprising the steps of:
  (a) confining a quantity of said matter within a closed cavity capable of withstanding high intensity shock wave impulses and high pressure build-up;
  (b) including in said cavity a non-gaseous fluid capable of transmitting high intensity shock wave impulses and high pressure build-up, with said non-gaseous fluid and said matter filling said cavity;
  (c) and discharging from electrodes immersed in said substance a quantity of electric energy per cubic inch of cavity of at least 10 joules per cubic inch, with said discharge taking place within a time interval of less than one millisecond and with the discharge current at least 1500 amperes.

14. The method as set forth by claim 13, wherein the non-gaseous fluid is also the matter.

15. The method as set forth by claim 13, wherein the non-gaseous fluid in a cavity portion containing the electrodes is physically isolated but still in effective shock wave and pressure transmitting coupled relation to the non-gaseous fluid and matter in the remaining cavity portion.

16. The method to destroy bacteria in matter, comprising the steps of:
  (a) confining a quantity of said matter within a closed cavity capable of withstanding high intensity shock wave impulses and high pressure build-up;
  (b) including in said cavity a non-gaseous fluid capable of transmitting high intensity shock wave impulses and high pressure build-up, with said non-gaseous fluid and said matter filling said cavity;
  (c) and discharging from electrodes immersed in said non-gaseous fluid a quantity of electric energy per cubic inch of cavity of at least 10 joules per cubic inch, with said discharge taking place within a time interval within the range of 50 to 300 microseconds and with the discharge current being within the range of 5,000 to 60,000 amperes.

17. The method as set forth by claim 16, wherein the non-gaseous fluid is also the matter.

18. The method as set forth by claim 16, wherein the non-gaseous fluid in a cavity portion containing the electrodes is physically isolated but still in effective shock wave and pressure transmitting coupled relation to the non-gaseous fluid and matter in the remaining cavity portion.

19. A process for destroying microorganisms in an aqueous liquid medium comprising the steps of
  passing an unpurified fluid into an electrohydraulic chamber in which the fluid is confined for the duration of the purification process,
  charging a capacitance to a desired level of electric energy capable of delivering a shock wave to said aqueous medium having a minimum effective energy level within the range of 10–96 joules per cubic inch,
  initiating at least one electrohydraulic shock at a relatively low voltage within the fluid contained in the electrohydraulic chamber by discharging the capacitance whereby microorganisms within the fluid are destroyed and the fluid thereby becomes purified, and
  passing the purified fluid from the electrohydraulic chamber for utilization thereof.

References Cited

UNITED STATES PATENTS

| | | | |
|---|---|---|---|
| 3,366,564 | 1/1968 | Allen | 204—186 |
| 2,163,650 | 6/1939 | Weaver | 21—54.1 |
| 2,193,622 | 3/1940 | Coulter | 21—54.1 |
| 2,405,740 | 8/1946 | Flosdorf | 21—54.1 |
| 2,738,172 | 3/1956 | Spiess, Jr., et al. | 259—1 |
| 2,931,947 | 4/1960 | Fruengel | 21—54 |
| 2,955,076 | 10/1960 | Gossling | 99—217 |

FOREIGN PATENTS 620,856  5/1961  Canada.

JOHN H. MACK, Primary Examiner

T. TUFARIELLO, Assistant Examiner

U.S. Cl. X.R.

21—102, 60; 99—219, 233; 210—19